Oct. 16, 1956     B. T. GROBOWSKI     2,766,802

MOLDED PLASTIC WHEEL WITH SEMI-PNEUMATIC TIRE

Filed June 17, 1954

*INVENTOR.*
BENNY T. GROBOWSKI

BY

ATTORNEYS

United States Patent Office 2,766,802
Patented Oct. 16, 1956

2,766,802

MOLDED PLASTIC WHEEL WITH SEMI-PNEUMATIC TIRE

Benny T. Grobowski, Newark, Ohio, assignor to The E. T. Rugg Company, Newark, Ohio, a corporation of Ohio Application June 17, 1954, Serial No. 437,467

3 Claims. (Cl. 152—384)

My invention relates to a molded plastic wheel with semi-pneumatic tire. It has to do, more particularly, with a relatively small wheel and tire combination especially suitable for use on lawnmowers, small carts, etc.

According to my invention, the wheel portion is molded as an integral unit from a rigid thermoplastic material. The tire is formed of rubber or suitable flexible plastic material. The tire is hollow and is mounted on the rim of the wheel. The tire and wheel cooperate in such a manner as to prevent displacement of the tire relative to the wheel in both axial and circumferential directions.

The preferred embodiment of our invention is illustrated in the accompanying drawing wherein similar characters of reference designate corresponding parts and wherein.

Figure 1:
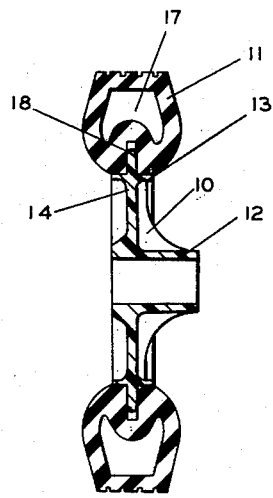
Figure 1 is a transverse sectional view through a wheel and tire in which my invention is embodied.
Figure 2:
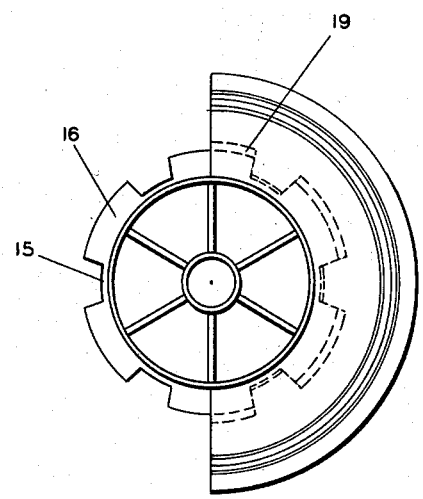
Figure 2 is a face view of the wheel with the tire thereon but showing only one-half of the tire.

With reference to the drawing, in Figures 1 and 2 I have illustrated my invention as comprising the wheel 10 and the tire 11. As previously stated, the wheel is molded in a single piece of a suitable rigid thermoplastic resin. The tire 11 is formed of suitable flexible material, preferably rubber. The two units are formed separately and then the tire 11 is mounted on the wheel.

The wheel 10 comprises the axle-receiving hub 12 and the circumferential rim 13 joined together by a disc or web 14. Extending outwardly from the rim 13 and substantially at right angles thereto is the continuous rib 15. Projecting outwardly from the rib 15 are the lugs 16 which are in the same transverse plane as the rib 15 and which are spaced radially therearound.

The tire 11 is of hollow construction so as to form a chamber 17 extending completely therearound. On the inner surface of the tire 11 there is provided a continuous slot or groove 18. At spaced intervals along this slot or groove 18 there are provided deeper lug-receiving sockets 19. These sockets 19 are of a proper size to receive the lug 16 and are spaced radially corresponding distances.

When the tire 11 is mounted on the wheel, it is stretched over the wheel so that the continuous rib 15 will fit into the continuous groove 18. Furthermore, the lugs 16 will extend into the complemental sockets 19. Thus, the tire will be effectively mounted on the wheel.

The lugs 16 and the continuous rib 15 will prevent lateral displacement or axial displacement of the tire on the rim 13 of the wheel. It is important for this purpose that the rib 15 be provided between the lugs 16. The lugs 16 fitting into the sockets 19 will prevent slipping of the tire 11 around the rim 13 of the wheel.

Figure 3:
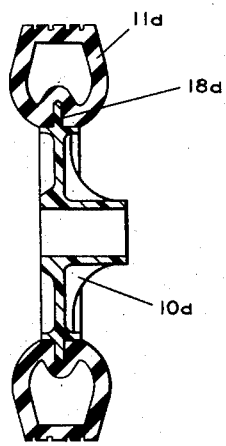
Figure 3 is a view like Figure 1 but showing a different form of my invention.
Figure 4:
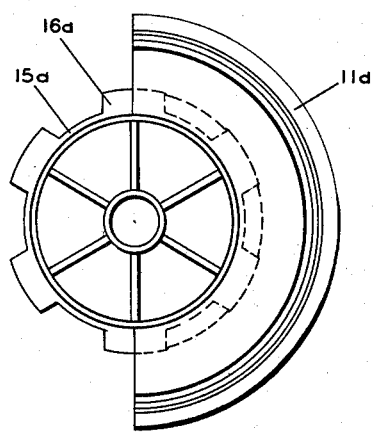
Figure 4 is a view like Figure 2 but showing the modified form of my invention of Figure 3.

In Figures 3 and 4, I have illustrated a modification of my structure wherein the sockets 19 are not provided in the inner side of the groove 18a formed in the tire 11a. However, the tire 11a will fit on the wheel 10a sufficiently tight that the outer ends of the lugs 16a, projecting from the continuous rib 15a, will form indentations in the bottom of the groove 18a to prevent rotation of the tire 11a on the wheel 10a.

It will be apparent from the above description that I have provided a wheel and tire which are of novel construction and which cooperate with each other in a novel manner. Relative movement of the two units in both lateral and circumferential directions is precluded by the novel cooperating structure.

Having thus described my invention, what I claim is:

1. A wheel having a separate tire removably mounted thereon, said wheel comprising a body and a rim, a continuous rib extending outwardly from said rim with integral lugs projection further outwardly therefrom at angularly spaced intervals, said tire having a continuous groove at its inner side with correspondingly spaced deeper sockets complemental to said lugs and receiving said rib and said lugs.

2. A wheel having a separate tire removably mounted thereon, said wheel comprising a body and a rim, a continuous rib extending outwardly from said rim with integral lugs projecting further outwardly therefrom at angularly spaced intervals, said tire having a continuous groove at its inner side receiving said rib and said lugs which is of slightly less diameter than a circle joining the outer ends of said lugs so that the lugs will extend into the tire at the base of the groove to prevent rotation of the tire on the wheel.

3. A wheel and tire according to claim 2 with the wheel being of rigid plastic and the tire being of flexible material.

References Cited in the file of this patent

UNITED STATES PATENTS

| 1,682,899 | Fletcher | Sept. 4, 1928 |
| 2,251,142 | Lindsay | July 29, 1941 |
| 2,655,684 | Robinson | Oct. 20, 1953 |